Nov. 16, 1943.     R. C. GAZLEY     2,334,188
FASTENING DEVICE
Filed April 21, 1942     2 Sheets-Sheet 1
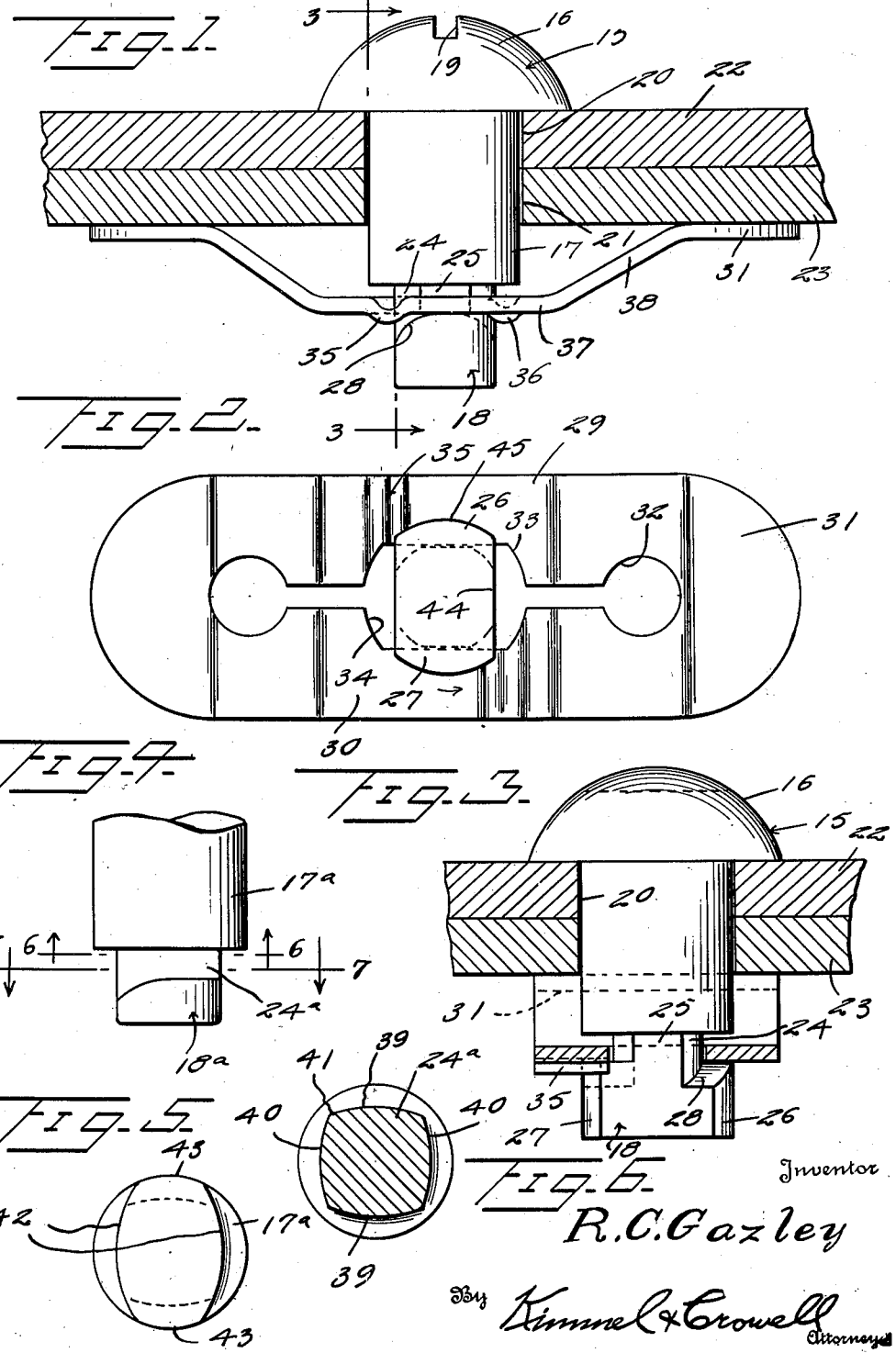
Inventor
R. C. Gazley
By Kimmel & Crowell
Attorneys

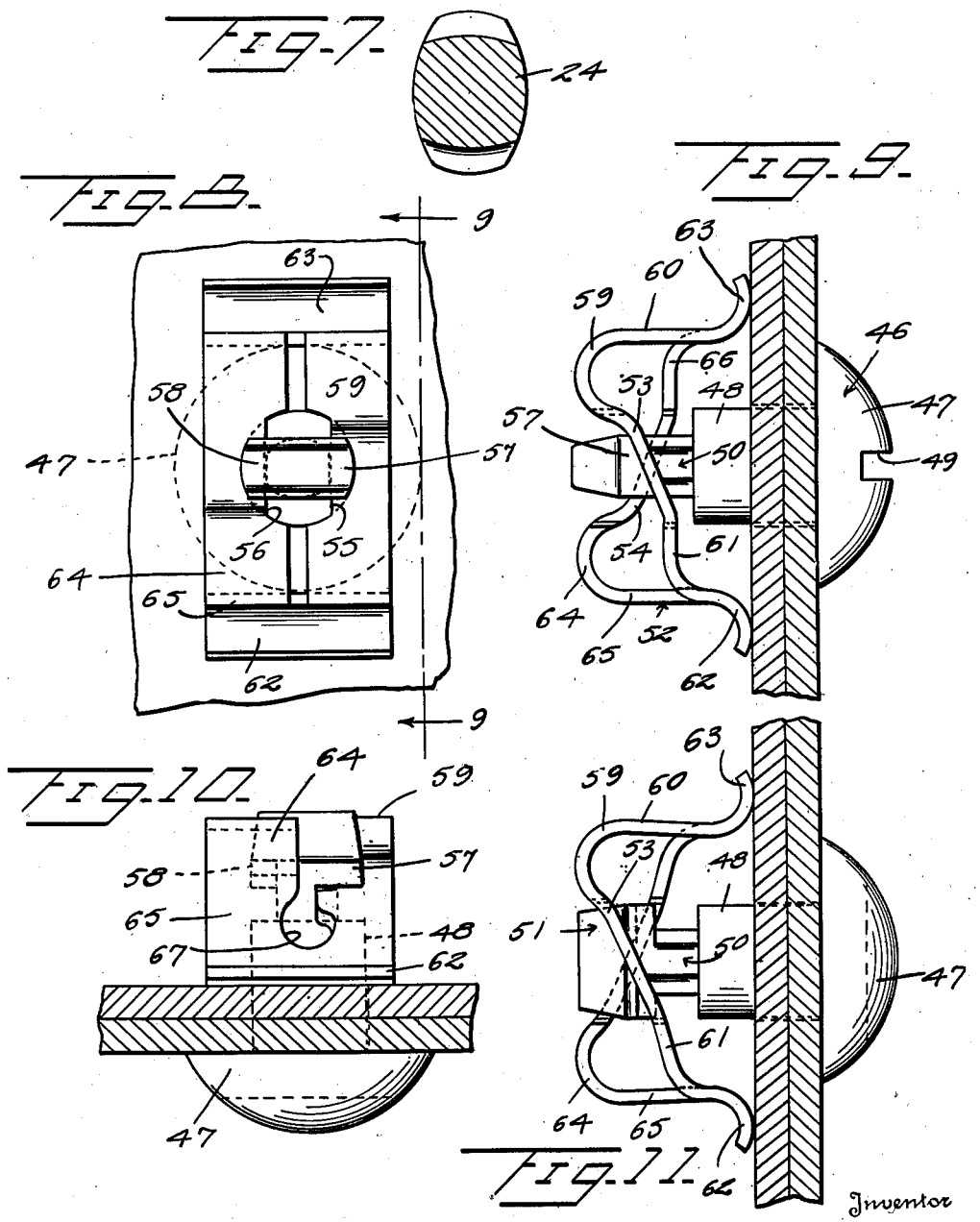

Patented Nov. 16, 1943

2,334,188

UNITED STATES PATENT OFFICE 2,334,188

FASTENING DEVICE

Richard C. Gazley, Grosse Pointe, Mich.

Application April 21, 1942, Serial No. 439,901

6 Claims. (Cl. 24—221)

This invention relates to quickly applied and removed fastening devices.

An object of this invention is to provide a fastening device which may be applied by a quarter turn and which is constantly maintained under sufficient pressure so that it will not become loosened under vibration.

Another object of this invention is to provide a fastening device embodying male and female members which are securely locked together by a quarter turn of one of the members and which will tightly hold the desired articles together.

A further object of this invention is to provide an improved nut and bolt structure wherein the usual threads are eliminated, the nut and bolt having correlated parts for holding the elements against loosening.

A further object of this invention is to provide a fastening device either as a permanent fastening structure for a joint, or as a semi-permanent or temporary fastening structure for joints which are frequently separated.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a detail side elevation of a fastening device constructed according to an embodiment of this invention showing the device in applied position, Figure 2 is a bottom plan of the device, Figure 3 is a sectional view taken on the line 3—3 of Figure 1, Figure 4 is a fragmentary side elevation of the locking bolt, Figure 5 is an inner end elevation of the locking bolt, Figure 6 is a sectional view taken on the line 6—6 of Figure 4, Figure 7 is a sectional view taken on the line 7—7 of Figure 4, Figure 8 is an inner end elevation of a modified form of this invention, Figure 9 is a detail side elevation partly in section of the fastening device shown in Figure 8, showing the device in clamping position, Figure 10 is a detail side elevation of the form shown in Figure 8 looking at right angles to Figure 9, and Figure 11 is a view similar to Figure 9, but showing the device in released position.

Referring to the drawings, and first to Figures 1 to 7 inclusive, the numeral 15 designates generally a bolt or one part of the fastening device to be hereinafter described, which includes a head 16, a shank 17 and a clamping head or element, generally designated as 18 which is carried by or formed integral with the inner end of the shank 17.

The head 16 in the present instance, is shown as being provided with a kerf 19, but it will be understood that if desired a polygonal head may be substituted for the head herein shown. The shank 17 is adapted to be extended through openings 20 and 21 which are formed in a pair of face abutting members 22 and 23 which it is desired to tightly secure together. The inner end of the shank 17 is formed with a reduced shank 24 which is formed with pairs of diametrically opposite flat faces 25. The clamping head 18 is formed with a pair of diametrically opposite cam-shaped locking members 26 and 27 having a cam-shaped edge portion 28 which is adapted to engage one of a pair of parallel resilient arms 29 engageable on the opposite or inner face of a joint which it is desired to tightly secure together. The arm 29 is disposed in parallel relation with the second arm 30 and the two arms 29 and 30 are connected together at the opposite ends thereof by an integral connecting base or clamping plate 31. The inner edges of the arms 29 and 30 are disposed in spaced apart relation and at the outer end portions of the arms 29 and 30 there is formed an enlarged opening 32 which will provide resiliency for the lateral bending of the arms 29 and 30 during the application of the fastening bolt 15.

The arm 29 is provided with a cutout 33 which is adapted to confront a complementary cutout 34 formed in the inner edge of the arm 30. The arm 29 is also provided with an inwardly offset stop member 35 against which the cam member 28 is adapted to engage so as to limit the rotation of the bolt 15 towards locking position. The arm 30 is also provided with an inwardly offset stop member 36 against which the cam member, carried by the clamping head 18 and correlated with the locking member 27 is adapted to engage. The clamping plate which is formed by the two arms 29 and 30 and the connecting members 31 is formed with a flat intermediate portion 37 and an obtusely inclined extension 38 which merges into the base or pressure plate 31. In this manner, the intermediate portion 37 will be inwardly offset from the inner element 23 and when the bolt 15 is rotated through a quarter turn, the intermediate portion 37 of each arm 29 and 30 will be drawn outwardly towards the adjacent face of the joint member 23, and the outer connecting members 31 may move outwardly in addition to being placed under pressure by reason of the outward pulling on the intermediate portion 37.

The opposed flat faces 25 on the reduced shank 24 are adapted to engage the inner edges of the cutouts 33 and 34 when the bolt 15 is in locking position. These flat faces 25 provide a means whereby the bolt 15 will thereby be held against accidental rotary movement towards a released position without undue pressure being applied to the bolt 15 which would effect a spread of the arms 29 and 30. The shank 24 is generally round in configuration except for the opposed flat faces 25 and the diameter of rounded portion of the reduced shank 24 is greater than the space between the cutouts 33 and 34.

In Figures 4 to 7 inclusive, there is disclosed a slightly modified form of locking or clamping bolt wherein the bolt shank 17a is formed with a reduced shank 24a having a clamping head 18a at the inner end thereof. The reduced shank 24a shown more clearly in Figure 6 is provided with rounded opposite faces 39 which are struck from the same radii and a second pair of rounded sides 40 which are struck from the same radii as the rounded sides 29, and the junction between the rounded sides 39 and 40 form rounded corners 41. The space between the rounded sides 39 or the rounded sides 40 is equal to the space between the cutouts 33 and 34, but by providing the rounded sides 39 and 40, the bolt can more readily be rotated to either a locking or a released position by application of a tool to the head thereof.

The long arc on which the rounded sides 39 and 40 are drawn provides the rounded instead of the flat sides, which are shown at 25 in Figure 1, and there is thereby provided a substantially polygonal shank which will resist turning after it has been applied to the desired article. The clamping head 18a is also provided with arcuate opposite sides 42 and 43. The radius of the arc 43 is equal to the radius of the shank 17a, whereas the radii of the two long arcs 42 are of greater length than the radii of the shank 17a.

In Figure 2 the locking head 18 is formed with parallel or flat opposite sides 44 and rounded sides 45 disposed between the flat sides 44. The radii of the rounded sides 45 are of the same length as the radii for the shank 17.

Referring now to Figures 8 to 11 inclusive, there is disclosed a further modification of this invention which includes a locking bolt 46 provided with a head 47 and a shank 48. The head 47 in the present instance is formed with a kerf 49, but it will be understood that the head 47 may be of polygonal configuration. The shank 48 has formed integral therewith a reduced shank 50 which also has formed integral therewith a cam-shaped clamping head 51. A clamping plate generally designated as 52 is adapted to be engaged by the clamping head 51 and comprises a pair of opposed clamping arms 53 and 54 which are disposed on opposite inclinations and have their inner edges spaced apart. The arm 53 is formed with a cutout 55 and the arm 54 is also formed with a complementary cutout 56. The head 51 is of a width sufficient to be extended through the space formed between the two cutouts 55 and 56, but when the bolt 46 is rotated through a quarter turn, the cam-shaped clamping members 57 and 58 which are carried by the head 51 are adapted to engage the arms 53 and 54 and place these arms under a predetermined clamping pressure.

The arm 53 at one end thereof is formed with an arcuate extension 59 which merges into an outwardly extending substantially straight extension 60. The opposite end portion of the arm 53 is formed with a relatively shallow arcuate extension 61 merging at its outer end in an oppositely curved connecting member 62. The outer end portion of the extension 60 also merges in an inwardly curved connecting member 63. The arm 54 at one end thereof is formed with an arcuate extension 64 similar to the extension 59 of the arm 53 and the extension 64 merges into a substantially straight extension 65 which is formed integral with the connecting member 62. The opposite end of the arm 54 merges into a relatively shallow arcuate extension 66 which is formed at its opposite end integral with the inwardly curved connecting member 63. A relatively large opening 67 is formed at the inner edges of the arm extensions 61 and 65 where these extensions merge with the pressure foot or connecting member 62. A similar large opening is provided on the opposite side of the clamping member or nut 52, where the arms 60 and 66 connect with the foot or connecting member 63.

In the use of this fastening device, the articles 22 and 23 which are to be fastened together are formed with the openings 20 and 21 to receive the shank 17 of the bolt 15. The nut or pressure member formed by the arms 29 and 30 is disposed opposite from the head 16 whereupon the clamping head 18 is extended through the slot formed by the opposed cutouts 33 and 34. A tool such as a screw driver or the like may then be applied to the head 16 and the bolt 15 rotated through a quarter turn. The rotation of the bolt 15 will be resiliently resisted by the arms 29 and 30 as in order to rotate the bolt 15, it is necessary that the two arms 29 and 30 be forcibly spread apart by the shank 24. Rotation of the bolt 15 through one quarter turn will cause the clamping members 26 and 27 to press the arms 29 and 30 outwardly towards the inner joint member 23, and where the connecting members 31 are not secured as by other fastening means or welding to the inner joint member 23, the arms 31 will be spread out by compression of the outwardly divergent extensions 38 of the arms 29 and 30. The stop members 35 and 36 will limit the rotation of the bolt 15 so that, in the application of the fastening device, the bolt 15 will not be accidentally rotated to a degree sufficient to dispose the clamping head 18 in a position where vibration or the like might accidentally release the clamping arms 29 and 30 from the head 18.

The structure shown in Figures 8 to 11 inclusive is applied in the same manner as that shown in Figures 1 to 7. In this latter form, the arcuate extensions 59 and 64 of the pressure arms 53 and 54 form stop members for the clamping head 51 so that the bolt 46 cannot be rotated for more than a quarter turn. The fastening devices herein disclosed can be manufactured very cheaply and can be used either as permanent, semi-permanent or quickly removable fastening devices which will not be injured by continued application or removal of the devices on the desired articles.

The outer end portions 62 and 63 of the pressure member 51, in the present instance, are shown unsecured to the inner part of the joint so that when the bolt 46 is rotated to a pressure applying position, the feet 62 and 63 may move outwardly under the tension of the arms 53 and 54. If desired, however, the feet 62 and 63 may be secured in any suitable manner to one part of the joint structure.

What I claim is:

1. A fastening device comprising in combination a bolt member and a clamping member, said clamping member being of resilient construction and formed with a pair of spaced resilient arms connected together at their outer ends and offset from said ends, said arms having confronting cutouts, said bolt including an outer shank, a reduced shank engageable in the opening formed by said cutouts, and laterally projecting cam-shaped pressure members carried by said reduced shank freely insertible between said cutouts and engageable with the outer sides of said arms upon partial rotation of said bolt to thereby place said clamping member under clamping pressure, said reduced shank including opposed pairs of arcuate sides having a radii greater in length than the radii of said outer shank forming cam members for holding said bolt against rotation without application of a tool thereto partial forcible rotation of said bolt also effecting edgewise bending of said arms.

2. A fastening device comprising in combination a bolt member and a clamping member, said clamping member being of resilient construction and formed with a pair of spaced resilient arms connected together at their outer ends and offset from said ends, said arms having confronting cutouts, a rearwardly offset stop member integral with each arm adjacent an end of said cutout, said bolt including a reduced shank engageable in the opening formed by said cutouts, said shank being formed with means engageable with opposed edges of said cutout for normally holding said bolt against rotation and laterally projecting cam-shaped pressure members carried by said shank freely insertible between said cutouts and engageable with the outer sides of said arms upon partial rotation of said bolt to thereby place said clamping member under clamping pressure partial forcible rotation of said bolt also effecting edgewise bending of said arms, said arms having the opposite faces thereof at right angles to the length of the bolt.

3. A fastening device comprising in combination a bolt member and a clamping member, said clamping member being of resilient construction and formed with a pair of spaced resilient arms connected together at their outer ends and offset from said ends, said arms having confronting cutouts, an acutely disposed outwardly extending extension at one end of each arm, an obtusely disposed outwardly extending extension at the opposite end of each arm, said bolt including a reduced shank engageable in the opening formed by said cutouts, said shank being formed with means engageable with opposed edges of said cutout for normally holding said bolt against rotation and laterally projecting cam-shaped pressure members carried by said shank freely insertible between said cutouts and engageable with the outer sides of said arms upon partial rotation of said bolt to thereby place said clamping member under clamping pressure partial forcible rotation of said bolt also effecting edgewise bending of said arms, said arms having the opposite faces thereof at right angles to the length of the bolt.

4. A fastening device comprising in combination a bolt member and a clamping member, said clamping member being of resilient construction and formed with a pair of spaced resilient arms connected together at their outer ends and offset from said ends, said arms having confronting cutouts, said bolt including a reduced shank engageable in the opening formed by said cutouts, said shank being formed with means engageable with opposed edges of said cutout for normally holding said bolt against rotation a clamping head integral with said reduced shank and having flat opposite sides and rounded opposite ends, partial forcible rotation of said bolt also effecting edgewise bending of said arms, said arms having the opposite faces thereof at right angles to the length of the bolt said ends projecting from said reduced shank and formed with cam faces for engagement with said arms.

5. A fastening device comprising in combination a bolt member and a clamping member, said clamping member being of resilient construction and formed with a pair of spaced resilient arms connected together at their outer ends and offset from said ends, said arms having confronting cutouts, said bolt including a reduced shank engageable in the opening formed by said cutouts, said shank being formed with means engageable with opposed edges of said cutout for normally holding said bolt against rotation a clamping head integral with said reduced shank and having an elliptical configuration in transverse section, the opposite small end of said head projecting laterally of said reduced shank and formed with cam faces for engagement with said arms said head being freely insertible through said cutouts, said arms having the opposite faces thereof at right angles to the length of the bolt.

6. A fastening device comprising a bolt member and a clamping member, said clamping member being of resilient construction and formed with a pair of spaced resilient arms connected together at their outer ends and offset from said ends, said arms having confronting cutouts, said bolt including a reduced shank formed with at least one pair of diametrically opposed substantially flat faces and the longest diameter of said shank being greater than the distance between said cutouts, and a pressure head integral with said shank, said head including a pair of laterally projecting cam-shaped pressure members engageable with the adjacent face of said clamping member, the transverse thickness of said head being formed of at least two diameters, with one diameter being slightly less than the combined width of said cutouts whereby said head may be initially freely inserted through said cutouts without distortion of said arms, rotation of said bolt effecting edgewise longitudinal bending of said arms.

RICHARD C. GAZLEY.